x`

(12) United States Patent
Williamson et al.

(10) Patent No.: US 8,776,475 B2
(45) Date of Patent: Jul. 15, 2014

(54) DLO MOLDING WITH DUTCH BEND FEATURE AND CLIP RETENTION FEATURE

(75) Inventors: Michael E Williamson, Shelby Township, MI (US); Alain Pelchat, Woodbridge (CA); Alcino Oliveira, Maple (CA); Kenneth G Besedich, Rochester Hills, MI (US); Faisal Sultan, Macomb, MI (US); Marc R Risdale, Dundas (CA); Matthew C Patterson, Warren, MI (US); James R Roll, Ann Arbor, MI (US)

(73) Assignee: Magna International Inc, Aurora, Ontario (CA)

( * ) Notice: Subject to any disclaimer, the term of this patent is extended or adjusted under 35 U.S.C. 154(b) by 160 days.

(21) Appl. No.: 13/563,904

(22) Filed: Aug. 1, 2012

(65) Prior Publication Data
US 2013/0031865 A1 Feb. 7, 2013

Related U.S. Application Data (60) Provisional application No. 61/513,803, filed on Aug. 1, 2011.

(51) Int. Cl.
*E04C 2/38* (2006.01)
(52) U.S. Cl.
USPC ........................................ 52/716.5; 52/716.7
(58) Field of Classification Search
USPC ............ 52/716.1, 716.2, 716.4, 716.5, 716.6, 52/716.7, 716.8, 717.03
See application file for complete search history.

(56) References Cited

U.S. PATENT DOCUMENTS

| | | | | | |
|---|---|---|---|---|---|
| 4,530,192 | A | * | 7/1985 | Ginster | 52/204.591 |
| 4,565,032 | A | * | 1/1986 | Adell | 49/462 |
| 4,621,469 | A | * | 11/1986 | Kruschwitz | 52/208 |
| 4,753,041 | A | * | 6/1988 | Adell | 49/462 |
| 4,765,673 | A | * | 8/1988 | Frabotta et al. | 296/93 |
| 4,817,335 | A | * | 4/1989 | Adell | 49/462 |
| 4,858,988 | A | * | 8/1989 | Morgan et al. | 296/201 |
| 4,952,442 | A | * | 8/1990 | Warner | 428/83 |
| 4,959,081 | A | * | 9/1990 | Mathellier | 49/490.1 |
| 5,261,206 | A | * | 11/1993 | Mesnel et al. | 52/716.1 |
| 5,752,352 | A | * | 5/1998 | Goto et al. | 52/208 |
| 5,866,232 | A | * | 2/1999 | Gatzmanga | 428/122 |
| 5,927,040 | A | * | 7/1999 | Kuwabara | 52/716.8 |
| 6,226,953 | B1 | * | 5/2001 | Uno et al. | 52/716.5 |
| 6,625,941 | B2 | * | 9/2003 | Shaw | 52/211 |
| 6,810,635 | B2 | * | 11/2004 | Meizlish | 52/716.5 |
| 8,205,923 | B2 | * | 6/2012 | Mourou | 296/1.08 |
| 8,474,214 | B2 | * | 7/2013 | Dawe et al. | 52/716.6 |

(Continued)

*Primary Examiner* — Mark Wendell
*Assistant Examiner* — Keith Minter
(74) *Attorney, Agent, or Firm* — Miller Canfield (57) ABSTRACT

A window surround molding is secured on a vehicle door flange with a retainer clip. The molding extends in a longitudinal direction and has a cross-section including first and second channels separated by a Dutch bend. The flange is disposed in the second channel on one side of the Dutch bend. The clip is disposed in the first channel on an opposite side of the Dutch bend. An arm extends in the longitudinal direction away from first and second ends of the clip and engages the molding to secure the clip within the first channel. The clip also includes a lower edge that engages the Dutch bend. A flex tab protrudes from a front face of the clip and engages the flange to secure the molding on the flange and to prevent rotation of the molding relative to the flange.

20 Claims, 6 Drawing Sheets

(56) References Cited

U.S. PATENT DOCUMENTS

| | | | |
|---|---|---|---|
| 8,505,262 B2 * | 8/2013 | Senge | 52/716.5 |
| 2003/0110732 A1 * | 6/2003 | Vance | 52/716.5 |
| 2007/0257449 A1 * | 11/2007 | Pelchat et al. | 277/650 |
| 2009/0195013 A1 * | 8/2009 | Suzuki et al. | 296/146.5 |
| 2012/0060422 A1 * | 3/2012 | Roll et al. | 49/441 |
| 2012/0297726 A1 * | 11/2012 | Ellis et al. | 52/716.7 |
| 2013/0081255 A1 * | 4/2013 | Bachelder et al. | 29/525.02 |
| 2013/0277516 A1 * | 10/2013 | Patterson et al. | 248/231.81 |

\* cited by examiner

DLO MOLDING WITH DUTCH BEND FEATURE AND CLIP RETENTION FEATURE

CROSS-REFERENCE TO RELATED APPLICATION

This application claims priority to and all the benefits of U.S. Provisional Application Ser. No. 61/513,803, filed Aug. 1, 2011.

BACKGROUND OF THE INVENTION

1. Field of the Invention

The present invention relates to a window surround molding for an automotive vehicle door. More particularly, the present invention relates to a window surround molding and a retainer clip for securing and stabilizing the window surround molding on a vehicle door frame.

2. Description of Related Art

Automotive vehicle door assemblies include a door frame having a window opening and a glass window. The window can be selectively raised to close the window opening and lowered to open the window opening. A window surround molding is commonly affixed to the door frame around the window opening as a decorative feature. Conventional window surround moldings are generally extruded and retainer clips are used for attaching the extruded window surround moldings to a periphery of the window opening. One known disadvantage with conventional window surround moldings that are mounted to the door frame with retainer clips is that the retainer clips allow the window surround molding to tilt or pull away from the door frame.

It is desirable, therefore, to provide a window surround molding and retainer clip that securely attaches the window surround molding to a door frame and prevents the window surround molding from rocking or tilting.

SUMMARY

According to one embodiment of the invention, a retainer clip is used to secure a window surround molding on a flange of a vehicle door. The window surround molding extends in a longitudinal direction and has a cross-section generally perpendicular to the longitudinal direction. The cross-section of the window surround molding includes a first channel and a second channel separated by a hem. The second channel is adapted for receiving a distal end of the flange therein. The retainer clip extends in the longitudinal direction between a first end and a second end. Each of the first and second ends include an arm extending in the longitudinal direction away from the first and second ends. The arm directly engages the window surround molding to secure the retainer clip within the first channel. The retainer clip includes an upper edge and a lower edge. The lower edge of the retainer clip directly engages the hem of the window surround molding between the first and second channels. The retainer clip includes a flex tab protruding from a front face thereof. The flex tab is adapted for directly engaging the outer side of the flange to secure the window surround molding on the flange and to prevent rotation of the window surround molding relative to the flange.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE EMBODIMENTS

Figure 1:
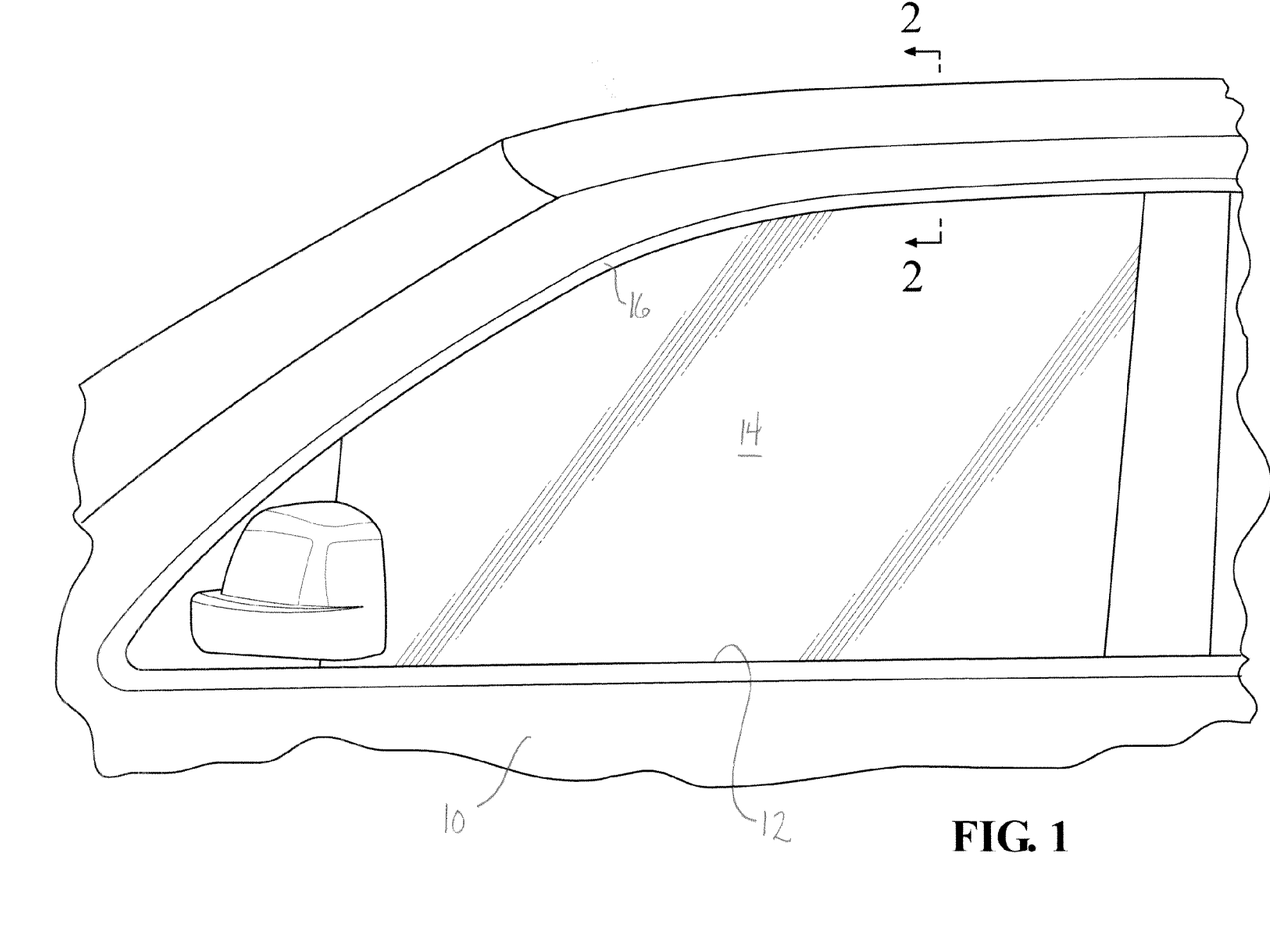
FIG. 1 is a side view of a front door of a motor vehicle including a window surround molding.
Figure 2:
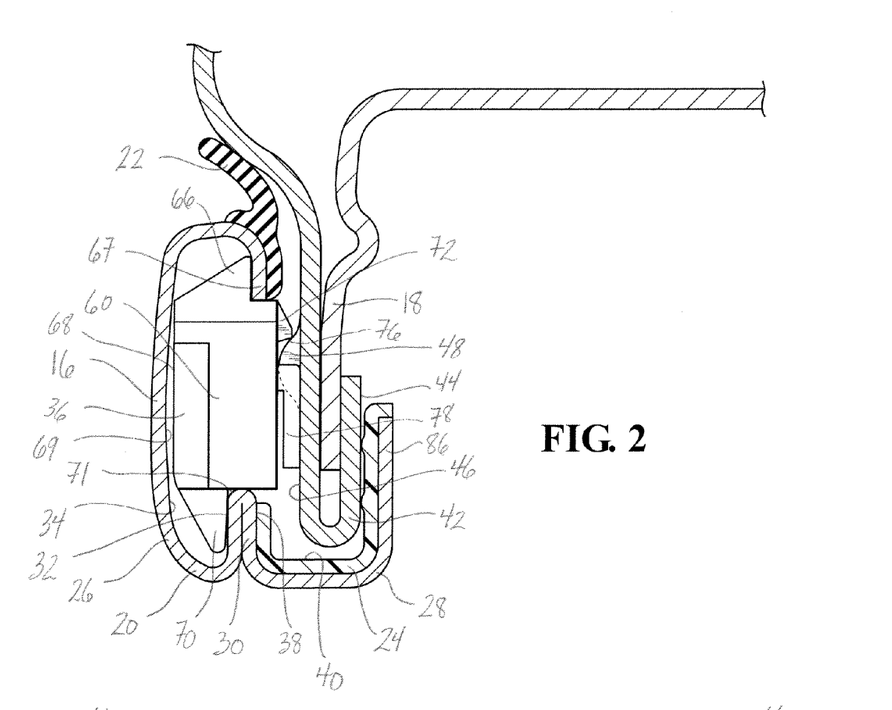
FIG. 2 is a cross-sectional view of the window surround molding taken through lines 2-2 in FIG. 1 illustrating an end view of a retainer clip securing the window surround molding on a door flange according to a first embodiment of the invention.

Referring to the Figures, a door 10 of a motor vehicle defines a window opening 12 for receiving a window pane 14 that is movable between a raised position and a lowered position, as is well known in the art. A window surround molding 16 is mounted on the door 10 and extends at least partially around a periphery of the window opening 12. The periphery of the window opening 12 includes a flange 18. A cross-sectional view of the window surround molding 16 mounted on the flange 18 is shown in FIG. 2. Although the window surround molding 16 is shown on a front door in FIG. 1 it is appreciated that the invention is applicable to any door on the vehicle.

In the current embodiment, the window surround molding 16 extends in a longitudinal direction and is formed using an extrusion process. The window surround molding 16 is formed to include a main member 20 and a closeout lip 22. In one embodiment, the main member 20 is formed from stainless steel and the closeout lip 22 is formed from thermoplastic vulcanizate (TPV), which in this instance is relatively flexible, and follows a contour of the flange 18. The main member 20 and the closeout lip 22 may be formed from any variety of materials without varying from the scope of the invention. The closeout lip 22 is co-extruded with the main member 20. A secondary layer 24 formed from TPV is also co-extruded with the main member 20.

FIG. 2 shows a cross-section of the window surround molding 16 and the flange 18 taken generally perpendicular to the longitudinal direction. Referring to the cross-section, the main member 20 includes a first or C-shaped portion 26, a second or U-shaped portion 28, and a hem or Dutch bend 30 joining the C-shaped portion 26 and the U-shaped portion 28 together. The C-shaped portion 26 and a first side 32 of the Dutch bend 30 form a first channel 34 that is adapted to receive a retainer clip 36 therein. The retainer clip 36 assists with securing the window surround molding 16 to the flange 18 and stabilizes the window surround molding 16 to prevent rocking or tilting of the window surround molding 16 relative to the flange 18, as is described in detail below.

The U-shaped portion 28 and a second side 38 of the Dutch bend 30 form a second channel 40 that is adapted to receive a distal end 42 of the flange 18 therein. The secondary layer 24 is extruded on an inner surface of the second channel 40 such that a portion of the secondary layer 24 is in direct contact with an inner side 44 of the flange 18. The secondary layer 24 is generally flexible or compliant and provides for a secure fit of the window surround molding 16 on the flange 18 while accounting for manufacturing variations in the window surround molding 16, the retainer clip 36, and the flange 18. An outer side 46 of the flange 18 includes a localized protrusion 48 that interacts with the retainer clip 36. The protrusion 48 has a width extending in the longitudinal direction.

Figure 3:
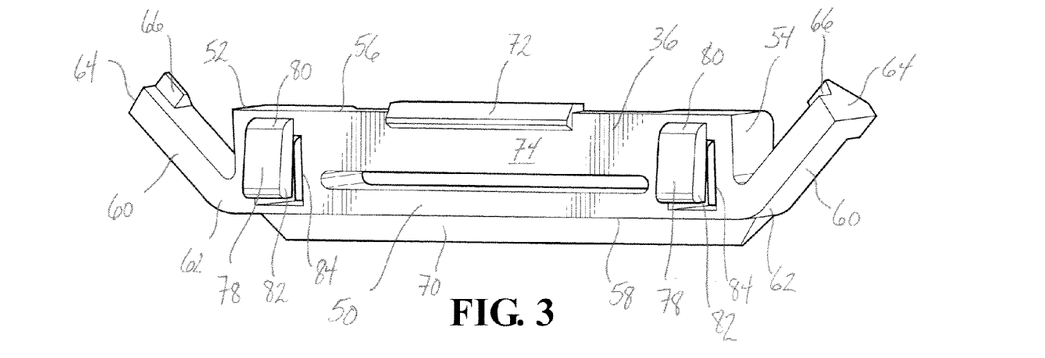
FIG. 3 is a is a front perspective view of the retainer clip shown in FIG. 2.
Figure 4:
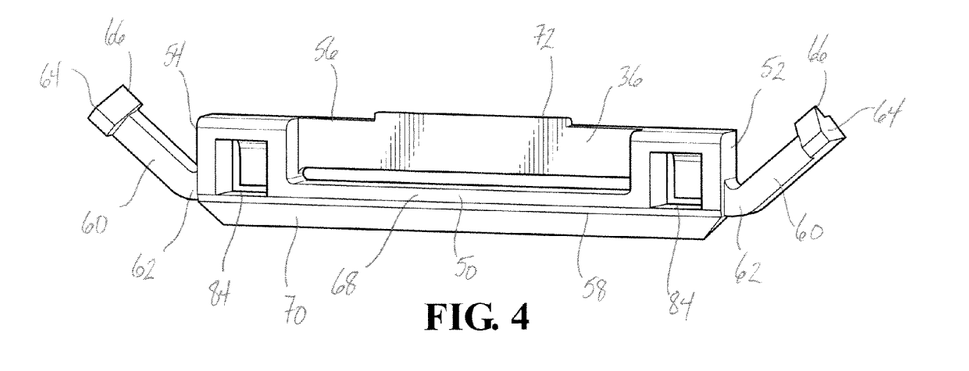
FIG. 4 is a rear perspective view of the retainer clip show in FIG. 2.
Figure 5:
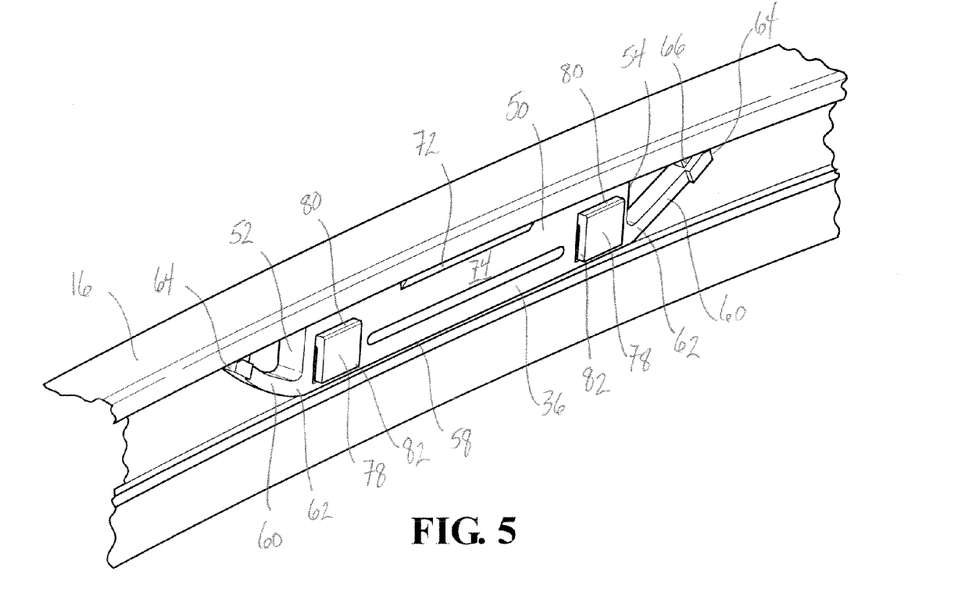
FIG. 5 is a front perspective view of the retainer clip inserted into the window surround molding.
Figure 6:
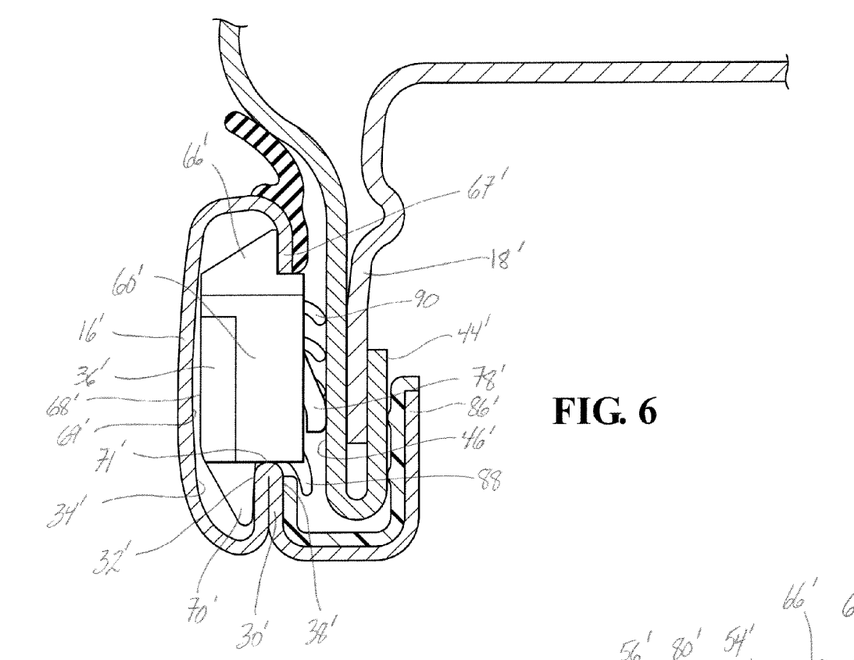
FIG. 6 is a cross-sectional view of the window surround molding illustrating an end view of a retainer clip securing the window surround molding on the door flange according to a second embodiment of the invention.
Figure 7:
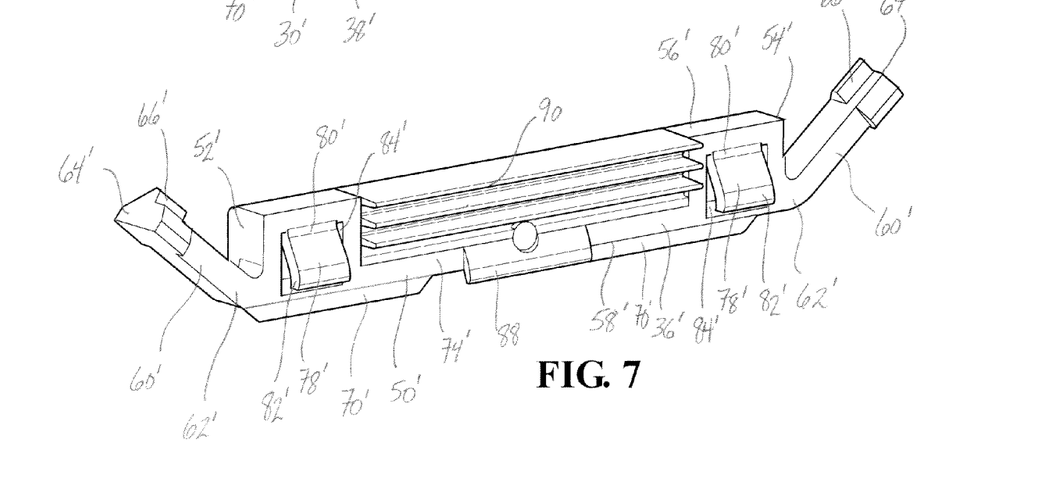
FIG. 7 is a front perspective view of the retainer clip shown in FIG. 6.
Figure 8:
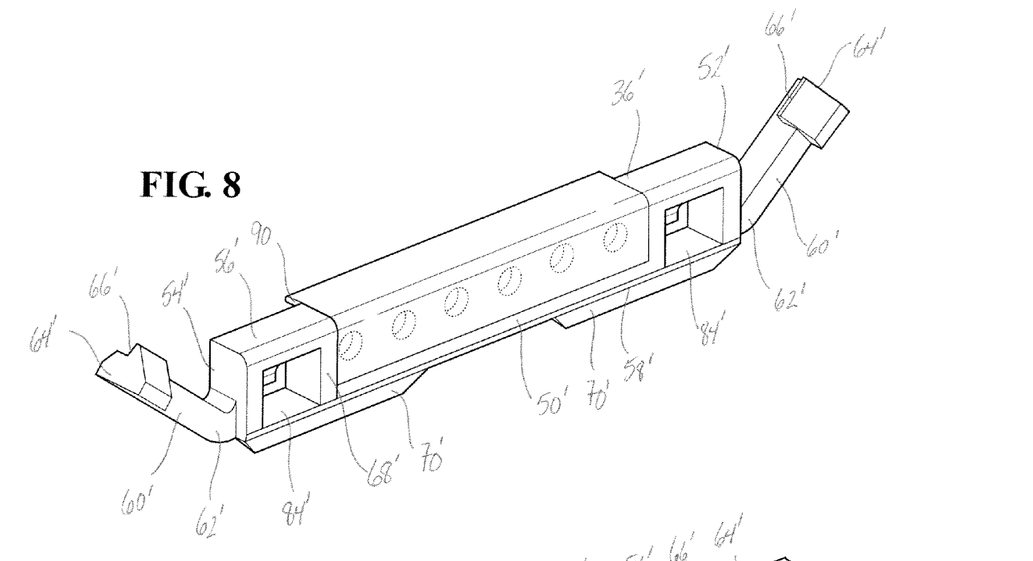
FIG. 8 is a rear perspective view of the retainer clip shown in FIG. 6.
Figure 9:
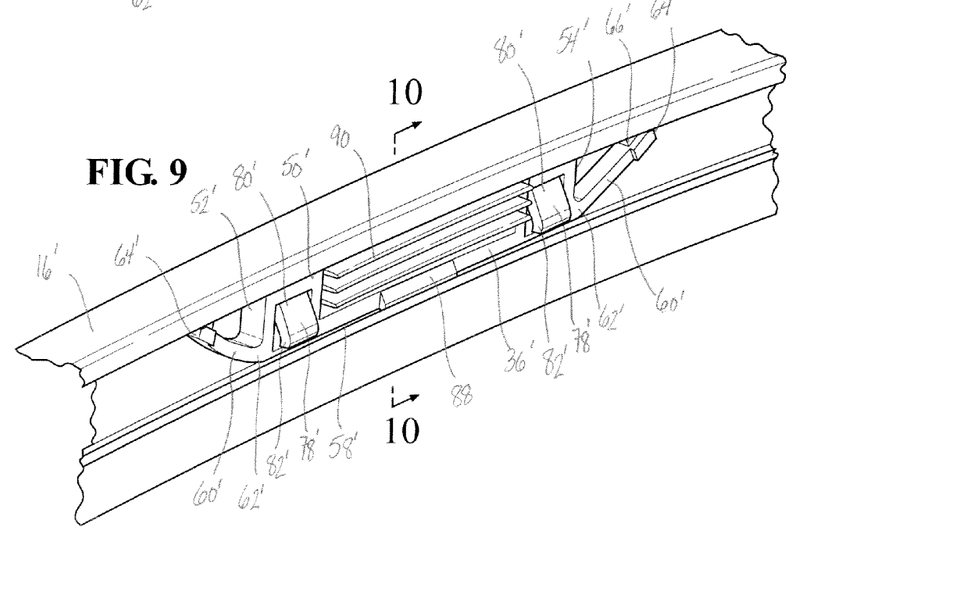
FIG. 9 is a front perspective view of the retainer clip shown in FIG. 6 inserted into the window surround molding.
Figure 10:
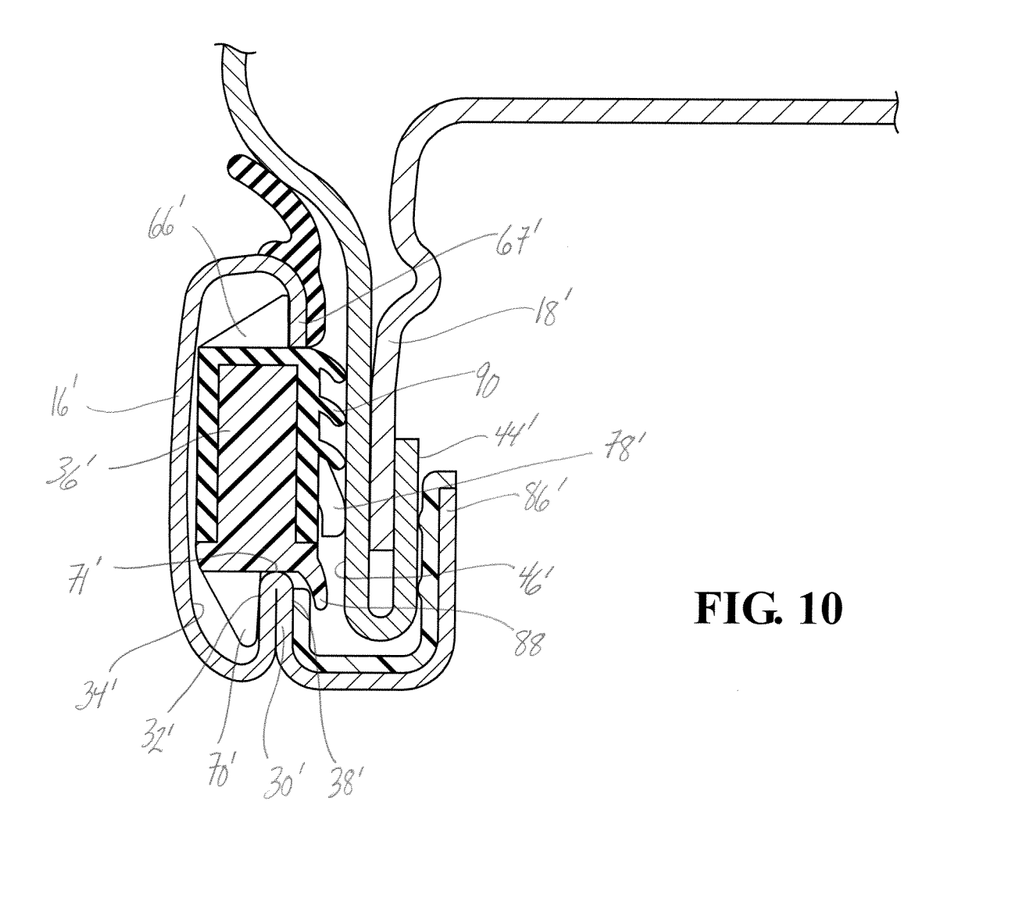
FIG. 10 is a cross-sectional view of the window surround molding, retainer clip and door flange taken through lines 10-10 in FIG. 9.

Referring to FIGS. 3 through 5, the retainer clip 36 includes an elongated body 50 extending in the longitudinal direction between a first end 52 and a second end 54. The body 50 includes an upper edge 56 and a lower edge 58. An arm 60 extends from each of the first and second ends 52, 54 of the body 50. The arms 60 are designed to engage with the window surround molding 16 to secure the retainer clip 36 within the first channel 34. In the embodiment shown, the arms 60 extend in opposite directions away from the first and second ends 52, 54 of the body 50, generally in the longitudinal direction. More specifically, each arm 60 extends between a proximal end 62 and a distal end 64. The proximal end 62 of each arm 60 is directly connected to one of the first and second ends 52, 54 of the body 50 adjacent the lower edge 58 thereof. The arms 60 extend from the proximal end 62 outwardly and upwardly to the distal end 64 such that the distal end 64 is disposed above the upper edge 56 of the body 50. The distal end 64 of each arm 60 includes an upper retention feature 66. The upper retention features 66 are adapted for engaging an upper lip 67 of the C-shaped portion 26 to secure the retainer clip 36 within the first channel 34. It is appreciated that the arms 60 will flex such that the distal ends 64 move away from the first and second ends 52, 54 of the body 50 to allow insertion of the retainer clip 36 into the first channel 34. When the retainer clip 36 is inserted into the first channel 34, the upper retention feature 66 at the distal end 64 of each arm 60 is engaged with the upper lip 67 of the C-shaped portion 26 to secure the retainer clip 36 within the first channel 34. In addition, when the retainer clip 36 is inserted into the first channel 34, a rear face 68 of the body 50 may directly engage an inner surface 69 of the C-shaped portion 26 of the window surround molding 16.

The retainer clip 36 also includes a lower retention feature 70 on the lower edge 58 of the body 50. In the present embodiment, the lower retention feature 70 extends along generally the entire length of the body 50 between the first and second ends 52, 54. The lower retention feature 70 guides the lower edge 58 of the retainer clip 36 into the first channel 34 of the window surround molding 16. When the retainer clip 36 is inserted into the first channel 34, the lower retention feature 70 is disposed adjacent to the first side 32 of the Dutch bend 30 and the lower edge 58 of the retainer clip 36 is wedged against an upper surface 71 of the Dutch bend 30 in response to a downward force created by the arms 60 engaged with the upper lip 67. The lower retention feature 70 prevents removal of the retainer clip 36 from the first channel 34 and, depending on manufacturing tolerances, the lower retention feature 70 may directly engage the first side 32 of the Dutch bend 30.

The retainer clip 36 further includes a lip tab 72 on a front face 74 of the body 50, generally adjacent the upper edge 56 thereof. The lip tab 72 extends along a portion of the front face 74 and is generally centered between the first and second ends 52, 54 of the body 50. When the window surround molding 16 and the retainer clip 36 are mounted on the flange 18, the lip tab 72 engages an upper side 76 of the protrusion 48 on the flange 18. It is appreciated that engagement between the lip tab 72 and the protrusion 48 will generally prevent removal of the window surround molding 16 from the flange 18.

In addition, the retainer clip 36 includes a pair of flex tabs 78 that engage the flange 18 to further secure the window surround molding 16 on the flange 18 and prevent rotation or tilting of the window surround molding 16 relative to the flange 18. More specifically, the flex tabs 78 protrude or extend from the front face 74 of the body 50 of the retainer clip 36. The flex tabs 78 are spaced apart in the longitudinal direction and are disposed generally adjacent each of the first and second ends 52, 54 of the body 50. Each one of the flex tabs 78 extends between a first end 80 that is secured to the front face 74 of the body 50 adjacent the upper edge 56 thereof and a second end 82 that is spaced apart from the front face 74 of the body 50 adjacent the lower edge 58 thereof. As such, the flex tabs 78 are flexibly coupled to the body 50 of the retainer clip 36 and will flex about the first ends 80 thereof. It is appreciated by those skilled in the art that an aperture 84 extending through the body 50 of the retainer clip 36 that is aligned with each one of the flex tabs 78 simplifies manufacturing of the retainer clip 36. When the window surround molding 16 and the retainer clip 36 are mounted on the flange 18, the flex tabs 78 engage the outer side 46 of the flange 18. It is contemplated that the flex tabs 78 may engage the outer side 46 of the flange 18 at a location that is generally across from an outer end 86 of the U-shaped portion 28 of the window surround molding 16. More specifically, a force generated by the flex tabs 78 pushing against the outer side 46 of the flange 18 is countered by the outer end 86 of the U-shaped portion 28 engaging the inner side 44 of the flange 18. While one particular design of the flex tabs 78 is shown in the Figures, it is appreciated that the flex tabs 78 may have any of a variety of designs that serve the same function without varying from the scope of the invention.

When the window surround molding 16 and retainer clip 36 are mounted on the flange 18, the flex tabs 78 are disposed on opposite sides of the protrusion 48. In other words, the protrusion 48 is located in the longitudinal direction between the flex tabs 78. It is further contemplated that the flange 18 will include a plurality of protrusions 48 spaced along the flange 18 in the longitudinal direction and the window surround molding 16 will be mounted on the flange 18 and secured with a plurality of retainer clips 36. As such, each one of the retainer clips 36 corresponds and interacts with one of the protrusions 48.

Referring to FIGS. 6 through 10, in a second embodiment of the invention, wherein like primed reference numerals represent similar elements as those described above, a retainer clip 36' assists with securing a window surround molding 16' to a flange 18' and stabilizes the window surround molding 16' to prevent rocking or tilting of the window surround molding 16' relative to the flange 18'. In contrast to the first embodiment, the flange 18' in the second embodiment does not include any protrusions 48.

The retainer clip 36' includes an elongated body 50' extending in a longitudinal direction between a first end 52' and a second end 54'. The body 50' includes an upper edge 56' and a lower edge 58'. An arm 60' extends from each of the first and second ends 52', 54' of the body 50'. The arms 60' are designed to engage with the window surround molding 16' to secure the retainer clip 36' within a first channel 34' of the window surround molding 16'. In the embodiment shown, the arms 60' extend in opposite directions away from the first and second ends 52', 54' of the body 50', generally in the longitudinal direction. More specifically, each arm 60' extends between a proximal end 62' and a distal end 64'. The proximal end 62' of each arm 60' is directly connected to one of the first and second ends 52', 54' of the body 50' adjacent the lower edge 58' thereof. The arms 60' extend from the proximal end 62' outwardly and upwardly to the distal end 64' such that the distal end 64' is disposed above the upper edge 56' of the body 50'. The distal end 64' of each arm 60' includes an upper retention feature 66'. The upper retention features 66' are adapted for engaging an upper lip 67' of the window surround molding 16' to secure the retainer clip 36' within the first channel 34'. It is appreciated that the arms 60' will flex such that the distal ends 64' move away from the first and second ends 52', 54' of the body 50' to allow insertion of the retainer clip 36' into the first channel 34'. When the retainer clip 36' is inserted into the first channel 34', the upper retention feature 66' at the distal end 64' of each arm 60' is engaged with the upper lip 67' of the window surround molding 16' to secure the retainer clip 36' within the first channel 34'. In addition, when the retainer clip 36' is inserted into the first channel 34', a rear face 68' of the body 50' may directly engage an inner surface 69' of the window surround molding 16'.

The retainer clip 36' also includes a lower retention feature 70' on the lower edge 58' of the body 50'. In the present embodiment, the lower retention feature 70' includes a first portion extending along the lower edge 58' towards the first end 52' of the body 50' and a separate second portion extending along the lower edge 58' towards the second end 54' of the body 50'. The lower retention feature 70' guides the lower edge 58' of the retainer clip 36' into the first channel 34' of the window surround molding 16'. When the retainer clip 36' is inserted into the first channel 34', the lower retention feature 70' is disposed adjacent to a first side 32' of a Dutch bend 30' of the window surround molding 16' and the lower edge 58' of the retainer clip 36' is wedged against an upper surface 71' of the Dutch bend 30' in response to a downward force created by the arms 60' engaged with the upper lip 67'. The lower retention feature 70' prevents removal of the retainer clip 36' from the first channel 34' and, depending on manufacturing tolerances, the lower retention feature 70' may directly engage the first side 32' of the Dutch bend 30'.

The retainer clip 36' further includes a finger tab 88 on a front face 74' of the body 50', generally adjacent the lower edge 58' thereof. The finger tab 88 extends along a portion of the front face 74' and is generally centered between the first and second ends 52', 54' of the body 50'. When the retainer clip 36' is inserted into the first channel 34', the finger tab 88 is disposed adjacent to a second side 38' of the Dutch bend 30' of the window surround molding 16'. The finger tab 88 ensures the lower edge 58' of the retainer clip 36' is positioned against the upper surface 71' of the Dutch bend 30' and, depending on manufacturing tolerances, the finger tab 88 may directly engage the second side 38' of the Dutch bend 30'.

The retainer clip 36' further includes a pair of flex tabs 78' that engage the flange 18' to secure the window surround molding 16' on the flange 18' and prevent rotation or tilting of the window surround molding 16' relative to the flange 18'. More specifically, the flex tabs 78' protrude or extend from the front face 74' of the body 50' of the retainer clip 36'. The flex tabs 78' are spaced apart in the longitudinal direction and are disposed generally adjacent each of the first and second ends 52', 54' of the body 50'. Each one of the flex tabs 78' extends between a first end 80' that is secured to the front face 74' of the body 50' adjacent the upper edge 56' thereof and a second end 82' that is spaced apart from the front face 74' of the body 50' adjacent the lower edge 58' thereof. As such, the flex tabs 78' are flexibly coupled to the body 50' of the retainer clip 36' and will flex about the first ends 80' thereof. It is appreciated by those skilled in the art that an aperture 84' extending through the body 50' of the retainer clip 36' that is aligned with each one of the flex tabs 78' simplifies manufacturing of the retainer clip 36'. When the window surround molding 16' and the retainer clip 36' are mounted on the flange 18', the flex tabs 78' engage an outer side 46' of the flange 18'. It is contemplated that the flex tabs 78' may engage the outer side 46' of the flange 18' at a location that is generally across from an outer end 86' of the window surround molding 16'. More specifically, a force generated by the flex tabs 78' pushing against the outer side 46' of the flange 18' is countered by the outer end 86' of the window surround molding 16' engaging an inner side 44' of the flange 18'.

In addition, the retainer clip 36' includes a plurality of fins 90 protruding from the front face 74' of the body 50' to further secure the window surround molding 16' on the flange 18'. The fins 90 are generally parallel and extend in the longitudinal direction between the flex tabs 78'. In the present embodiment, there are three fins 90 extending along the front face 74' of the body 50', however, there may be more or less fins 90 without varying from the scope of the invention. When the window surround molding 16' and the retainer clip 36' are mounted on the flange 18', the fins 90 engage the outer side 46' of the flange 18'. It is appreciated that engagement of the fins 90 and the flange 18' will generally prevent removal of the window surround molding 16' from the flange 18'. In one embodiment, the fins 90 are formed from TPV, which in this instance is relatively flexible, such that the fins flexibly engage the outer side 46' of the flange 18'. The fins 90, however, may be formed from a variety of materials without varying from the scope of the invention.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. In combination, a retainer clip and a window surround molding for a vehicle door having a flange with a distal end including an inner side facing a first direction and an outer side facing a second direction opposite the first direction, said combination comprising:

said window surround molding extending in a longitudinal direction and having a cross-section generally perpendicular to said longitudinal direction including a first channel and a second channel separated by a hem, said second channel adapted for receiving the distal end of the flange therein; and said retainer clip extending in said longitudinal direction between a first end and a second end, each of said first and second ends including an arm extending in said longitudinal direction away from said first and second ends, said arm directly engaging said window surround molding to secure said retainer clip within said first channel, and said retainer clip including an upper edge and a lower edge, said lower edge of said retainer clip directly engaging said hem of said window surround molding between said first and second channels;

said retainer clip including a flex tab protruding from a front face thereof, said flex tab is adapted for directly engaging the outer side of the flange to secure said window surround molding on the flange and to prevent rotation of said window surround molding relative to the flange.

2. The combination as set forth in claim 1 wherein said arm extends between a proximal end directly connected to one of said first and second ends and a distal end spaced apart from said first and second ends, wherein said distal end of said arm directly engages said window surround molding.

3. The combination as set forth in claim 2 wherein said window surround molding includes an upper lip spaced apart from said hem, and wherein said distal end of said arm directly engages said upper lip.

4. The combination as set forth in claim 3 wherein said distal end of said arm includes an upper retention feature, said upper retention feature directly engaging said upper lip.

5. The combination as set forth in claim 4 wherein said lower edge of said retainer clip includes a lower retention feature for guiding said retainer clip into said first channel of said window surround molding, said lower retention feature disposed on a first side of said hem, wherein said lower retention feature is adapted for contacting said first side of said hem to prevent removal of said retainer clip from said first channel.

6. The combination as set forth in claim 5 wherein said flex tab extends between a first end secured to said front face of said retainer clip adjacent said upper edge thereof and a second end spaced apart from said front face of said retainer clip adjacent said lower edge thereof.

7. The combination as set forth in claim 6 wherein said window surround molding is adapted for directly engaging the inner side of the flange to secure said window surround molding on the flange.

8. The combination as set forth in claim 7 wherein said retainer clip includes a pair of flex tabs, said pair of flex tabs spaced apart in said longitudinal direction.

9. The combination as set forth in claim 8 wherein said retainer clip includes a lip tab on said front face, said lip tab disposed in said longitudinal direction between said pair of flex tabs, and said lip tab is adapted for engaging a protrusion on the outer side of the flange to prevent removal of said window surround molding from the flange.

10. The combination as set forth in claim 7 wherein said retainer clip includes a finger tab protruding from said front face generally adjacent said lower edge thereof, said finger tab disposed on a second side of said hem, opposite said first side of said hem, to align said lower edge of said retainer clip with said hem.

11. The combination as set forth in claim 10 wherein said retainer clip includes a plurality of fins on said front face, said plurality of fins is adapted for engaging the outer side of the flange to prevent removal of said window surround molding from the flange.

12. The combination as set forth in claim 11 wherein said plurality of fins flexibly engages the flange.

13. The combination as set forth in claim 12 wherein said retainer clip includes a pair of flex tabs, said pair of flex tabs spaced apart in said longitudinal direction.

14. The combination as set forth in claim 13 wherein said plurality of fins is disposed in said longitudinal direction between said pair of flex tabs.

15. A retainer clip for securing a window surround molding on a vehicle door flange, said clip comprising:
a body extending in a longitudinal direction between a first end and a second end, said body including an upper edge and a lower edge, wherein said lower edge is adapted for directly engaging the window surround molding;
an arm extending in said longitudinal direction away from each of said first and second ends, wherein said arm is adapted for directly engaging the window surround molding;
a flex tab protruding from a front face of said body, said flex tab extending between a first end secured to said front face adjacent said upper edge thereof and a second end spaced apart from said front face adjacent said lower edge thereof, wherein said flex tab is adapted for directly engaging the vehicle door flange to secure the window surround molding on the vehicle door flange and to prevent rotation of the window surround molding relative to the vehicle door flange; and
a plurality of flexible fins on said front face, wherein said plurality of flexible fins is adapted for engaging the vehicle door flange to prevent removal of the window surround molding therefrom.

16. The retainer clip as set forth in claim 15 wherein said arm extends between a proximal end directly connected to one of said first and second ends and a distal end spaced apart from said first and second ends, wherein said distal end of said arm includes an upper retention feature adapted for directly engaging the window surround molding.

17. The retainer clip as set forth in claim 16 wherein said lower edge of said body includes a lower retention feature for guiding said retainer clip into the window surround molding, and wherein said lower retention feature is adapted for contacting a portion of the window surround molding to prevent removal of said retainer clip therefrom.

18. The retainer clip as set forth in claim 17 including a pair of flex tabs, said pair of flex tabs spaced apart in said longitudinal direction.

19. The retainer clip as set forth in claim 18 wherein said plurality of flexible fins is disposed in said longitudinal direction between said pair of flex tabs.

20. The retainer clip as set forth in claim 19 including a finger tab protruding from said front face generally adjacent said lower edge thereof, said finger tab spaced apart from said lower retention feature to align said lower edge of said retainer clip with the window surround molding.

* * * * *